(12) United States Patent
Ishihara

(10) Patent No.: US 6,512,623 B1
(45) Date of Patent: Jan. 28, 2003

(54) SCANNING OPTICAL DEVICE

(75) Inventor: Keiichiro Ishihara, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/395,367

(22) Filed: Sep. 14, 1999

(30) Foreign Application Priority Data

Sep. 18, 1998 (JP) .......................................... 10-283427

(51) Int. Cl.$^7$ .............................................. G02B 26/08
(52) U.S. Cl. ........................ 359/205; 359/206; 359/216
(58) Field of Search ................................ 359/197, 205, 359/206, 212, 216, 217, 218, 219, 223

(56) References Cited

U.S. PATENT DOCUMENTS

| | | |
|---|---|---|
| 5,418,639 A | 5/1995 | Yamazaki |
| 5,488,502 A | 1/1996 | Saito |
| 5,701,190 A | 12/1997 | Mochizuki et al. |
| 5,774,251 A | 6/1998 | Sekikawa |
| 5,883,732 A * | 3/1999 | Takada et al. ............... 359/207 |
| 5,930,019 A * | 7/1999 | Suzuki et al. ............... 359/204 |
| 6,130,758 A * | 10/2000 | Ono .............................. 359/207 |
| 6,201,626 B1 * | 3/2001 | Kamikubo .................. 359/196 |
| 6,239,894 B1 * | 5/2001 | Ishibe ........................ 359/205 |
| 6,256,133 B1 * | 7/2001 | Suzuki et al. ............... 359/207 |

FOREIGN PATENT DOCUMENTS

| | | |
|---|---|---|
| EP | 0 441 350 | 8/1991 |
| EP | 0 461 660 | 12/1991 |
| EP | 0 851 261 | 7/1998 |
| EP | 0 853 253 | 7/1998 |
| JP | 8-171069 | 7/1996 |

* cited by examiner

Primary Examiner—Cassandra Spyrou
Assistant Examiner—Euncha Cherry
(74) Attorney, Agent, or Firm—Fitzpatrick, Cella, Harper & Scinto

(57) ABSTRACT

A scanning optical system includes a light source, a light deflector, a first optical system for making light beam emitted by the light source strike a deflection surface of the light deflector with the light beam having a width larger than a width of the deflection surface in a main scanning direction, and a second optical system for imaging the light beam deflected/reflected by the light deflector in form of spot on a surface to be scanned. The second optical system has a plurality of lenses, and at least one of the lenses has a surface whose generating-line corresponding to the main scanning direction is non-arcuated.

13 Claims, 9 Drawing Sheets

SCANNING OPTICAL DEVICE

BACKGROUND OF THE INVENTION

1. Field of the Invention

The present invention relates to a scanning optical system and image forming apparatus using the system. In particular, it relates to a scanning optical system which uses a polygon mirror as a light deflector to deflect/reflect a light beam emitted by a light source means and to optically scan the light beam on a scanned surface through an imaging optical system, thereby recording image information. The system is suitably used for an apparatus such as a laser beam printer or digital copying machine having an electrophotographic process. Also the present invention relates to a scanning optical system which properly corrects the curvature of field in the main scanning and sub-scanning directions to always obtain high-quality images without any pitch irregularity when the system uses an over-field optical system in which the width of a light beam incident on a polygon mirror in the main scanning direction is larger than the width of a deflection surface of the polygon mirror in the rotational direction, and an image forming apparatus using the system.

2. Related Background Art

As a conventional scanning optical system, an under-field optical system is generally used. In this optical system, the width (to be also referred to as the facet width of the polygon mirror hereinafter) of a deflection surface 95a (deflection/reflection surface) of a polygon mirror 95 as a light deflector in the rotational direction is larger than the width (to be also referred to as the main scanning light beam width of an incident light beam hereinafter) of a light beam incident on the deflection surface 95a of the polygon mirror 95 in a direction corresponding to the main scanning direction. In this scanning optical system, the width of the deflection surface 95a of the polygon mirror 95 is set to totally reflect a light beam incident from a predetermined direction at any angle.

Referring to FIG. 1, a light beam optically modulated and emitted by a light source means 91 is converted into a substantially collimated light beam by a collimator lens 92. The light beam (light amount) is limited by an aperture stop (slit) 93 and incident on a cylindrical lens 94 having a predetermined refracting power only within a sub-scanning cross-section. Of the substantially collimated light beam incident on the cylindrical lens 94, the light beam in a main scanning cross-section emerges in the substantially collimated state. The light beam in a sub-scanning cross-section converges to form an almost line image on the deflection surface (deflection/reflection surface) 95a of the polygon mirror 95. The light beam deflected/reflected by the light deflector is guided onto a scanned surface (photosensitive drum surface) 97 through an imaging optical system 96 having f-θ characteristics. The polygon mirror 95 is then rotated in the direction indicated by an arrow A in FIG. 1 to scan the light beam on the scanned surface 97 in the direction indicated by an arrow B in FIG. 1, thereby recording image information.

Recently, demands have arisen for increases in speed and resolution in image forming apparatuses such as laser beam printers and digital copying machines. In order to meet these demands, in the above under-field optical system, the rotational speed of the polygon mirror may be increased to shorten the time required for a light beam to scan one line on the photosensitive drum surface.

The number of revolutions of a driving motor for rotating/driving the polygon mirror is currently limited to 25,000 to 30,000 rpm with the use of ball bearings, and 35,000 to 40,000 with the use of fluid bearings such as air bearings, which lead to a great increase in cost. There is therefore a limit to the attempt to attain increases in the speed and resolution of an image forming apparatus by increasing the number of revolutions of the polygon mirror.

In order to increase the speed and resolution of an image forming apparatus, the number of times of scanning of the polygon mirror per rotation may be increased by increasing the number of deflection surfaces of the polygon mirror. In the under-field optical system, however, in order to obtain the same spot diameter, the polygon mirror needs to have deflection surfaces each having a size large enough to cover light beams having the same width and reflect them. For this reason, as the number of surfaces of the polygon mirror increases, the diameter of the polygon mirror increases, resulting in a decrease in the number of revolutions of a general driving motor. This makes it difficult to attain increases in speed and resolution.

Under the circumstances, a scanning optical system using an over-field optical system is disclosed in Japanese Laid-Open Patent Application No. 8-171069. In the over-field optical system, an incident light beam whose light beam width in a direction corresponding to the main scanning direction is larger than the width of a deflection surface of the polygon mirror in the rotational direction strikes the polygon mirror, and only the light beam deflected/reflected by a predetermined deflection surface is scanned on a scanned surface. According to this over-field optical system, even if the number of deflection surfaces increases, an increase in the diameter of the polygon mirror can be prevented. This makes it possible to increase the number of times of scanning per rotation without decreasing the number of revolutions.

To obtain a high-resolution image, the spot diameter on a photosensitive drum surface must be reduced to a small value. A spot diameter Dsp is determined as follows by a truncation factor k, f-θ coefficient f, aperture stop size Dap, and wavelength λ of a light beam to be used according to the following equation:

$$Dsp = k \times f / Dap \times \lambda$$

In the over-field optical system, since the facet width of the polygon mirror serves as a stop in the main scanning direction, the spot diameter on the scanned surface can be reduced without increasing the size of the polygon mirror. The over-field optical system is therefore very advantageous in increasing the speed and resolution of an image forming apparatus.

In an attempt to increase the resolution, the spot diameter on the scanned surface is reduced. With a reduction in spot diameter, the depth of focus (image plane depth) decreases. It is therefore preferable that curvature of field is properly corrected.

A light beam deflected/scanned by the polygon mirror forms a spot on the scanned surface through an imaging lens (imaging optical system) having f-θ characteristics and is scanned at a uniform velocity. For this reason, distortion (f-θ characteristics) must be sufficiently corrected.

The optical scanning system disclosed in Japanese Laid-Open Patent Application No. 8-171069 is an optical system made up of two cylindrical lenses each having a predetermined power in the main scanning direction and one cylindrical mirror having a predetermined power in the sub-scanning direction. In this optical system, asymmetry such as curvature of field or distortion due to oblique incidence of a light beam from a main scanning cross-section is not sufficiently corrected.

In addition, a deflection surface moves in the direction corresponding to the main scanning direction upon rotation of the polygon mirror. In the over-field optical system in which an incident light beam having a main scanning light beam width larger than the facet width of the polygon mirror strikes the polygon mirror, this movement of the deflection surface appears as a phenomenon of movement of the pupil position. This movement of the pupil position makes it difficult to correct curvature of field, and more specifically, distortion.

Assume that a light beam is incident from a deflecting/scanning surface at a predetermined angle. In this case as well, when a cylindrical lens having a predetermined power in the sub-scanning direction is disposed near the scanned surface, a return angle that can correct the curvature of field in the sub-scanning direction is uniquely determined. That is, there is no degree of freedom in positioning. In addition, the use of an elongated glass mirror leads to a great demerit in terms of cost, e.g., process cost and vapor deposition cost.

A scanning optical system in which an imaging optical system having f-θ characteristics is partly formed by using a reflection optical element may be used. The surface shape of the reflection optical element, however, demands a precision about four times that of the lens surface of a transmission optical element. When a mirror having a power is to be formed by molding using a plastic material, it is difficult to obtain stable molding characteristics. Hence, curvature of field, distortion, and the like may occur. In addition, aluminum or the like must be deposited on the reflection surface, resulting in a great demerit in terms of cost.

SUMMARY OF THE INVENTION

It is an object of the present invention to provide a scanning optical system using an over-field optical system and having a simple arrangement, in which each of a plurality of lenses constituting a second optical system, in particular, is properly shaped to properly correct curvature of field and distortion (f-θ characteristics) even if the pupil position moves in the main scanning direction upon rotation of a polygon mirror, and an image forming apparatus which can always form high-quality images without any pitch irregularity.

A scanning optical system of the present invention in which a first optical system makes a light beam emitted by a light source strike a deflection surface of a light deflector with the light beam having a width larger than the width of the deflection surface in a main scanning direction, and a second optical system forms an image of the light beam deflected/reflected by the light deflector in the form of a spot on a surface to be scanned (scanned surface) is characterized in that the second optical system has a plurality of lenses, and at least one of the lenses has a surface whose generating-line corresponding to the main scanning direction is non-arcuated.

In addition, this system is characterized in that the light beam emitted by the light source is incident on the deflection surface of the light deflector in the sub-scanning cross-section at a predetermined angle and is incident on the deflection surface from substantially the center of the deflection angle of the light deflector in a main scanning cross-section.

In addition, this system is characterized in that the light beam emitted by the light source means is incident on the deflection surface of the light deflector in the sub-scanning cross-section at a predetermined angle and is incident on the deflection surface from substantially the center of the deflection angle of the light deflector in a main scanning cross-section, the imaging magnification of the second optical system is not more than 1, the lens having the surface whose generating-line is non-arcuated is located closer to the scanned surface than the remaining lenses, at least one of the lenses constituting the second optical system also serves as part of the first optical system, and at least one of the lenses constituting the second optical system has one peripheral portion partly cut off.

Furthermore, a scanning optical system of the present invention in which a first optical system makes a light beam emitted by a light source strike a deflection surface of a light deflector with the light beam having a width larger than the width of the deflection surface in a main scanning direction, and a second optical system forms an image of the light beam deflected/reflected by the light deflector in the form of a spot on a surface to be scanned (scanned surface) is characterized in that the second optical system has a plurality of lenses, and at least one of the lenses changes in radius of curvature in the sub-scanning direction along the main scanning direction without any correlation to the generating-line corresponding to the main scanning direction.

This system is further characterized in that the light beam emitted by the light source is incident on the deflection surface of the light deflector in a sub-scanning cross-section at a predetermined angle and is incident on the deflection surface from substantially the center of the deflection angle of the light deflector in a main scanning cross-section, the imaging magnification of the second optical system is not more than 1, the lens whose radius of curvature in the sub-scanning direction changes along the main scanning direction without any correlation to the generating-line corresponding to the main scanning direction is located closer to the scanned surface than the remaining lenses, at least one of the lenses constituting the second optical system also serves as part of the first optical system, and at least one of the lenses constituting the second optical system has one peripheral portion partly cut off.

Moreover, a scanning optical system of the present invention in which a first optical system makes a light beam emitted by a light source strike a deflection surface of a light deflector with the light beam having a width larger than the width of the deflection surface in a main scanning direction, and a second optical system forms an image of the light beam deflected/reflected by the light deflector in the form of a spot on a surface to be scanned (scanned surface) is characterized in that the second optical system has a plurality of lenses, and at least one of the lenses has a surface whose generating-line corresponding to the main scanning direction is non-arcuated, and changes in radius of curvature in a sub-scanning direction along the main scanning direction without any correlation to a generating-line corresponding to the main scanning direction.

This system is further characterized in that the light beam emitted by the light source is incident on the deflection surface of the light deflector in a sub-scanning cross-section at a predetermined angle and is incident on the deflection surface from substantially the center of a deflection angle of the light deflector in a main scanning cross-section, the imaging magnification of the second optical system is not more than 1, the lens having the surface whose generating-line corresponding to the main scanning direction is non-arcuated and changing in radius of curvature in the sub-scanning direction along the main scanning direction without any correlation to the generating-line corresponding to the main scanning direction is located closer to the scanned surface than the remaining lenses.

An image forming apparatus of the present invention is characterized by forming images using any one of the scanning optical systems described above.

DETAILED DESCRIPTION OF THE PREFERRED EMBODIMENTS

Figure 1:
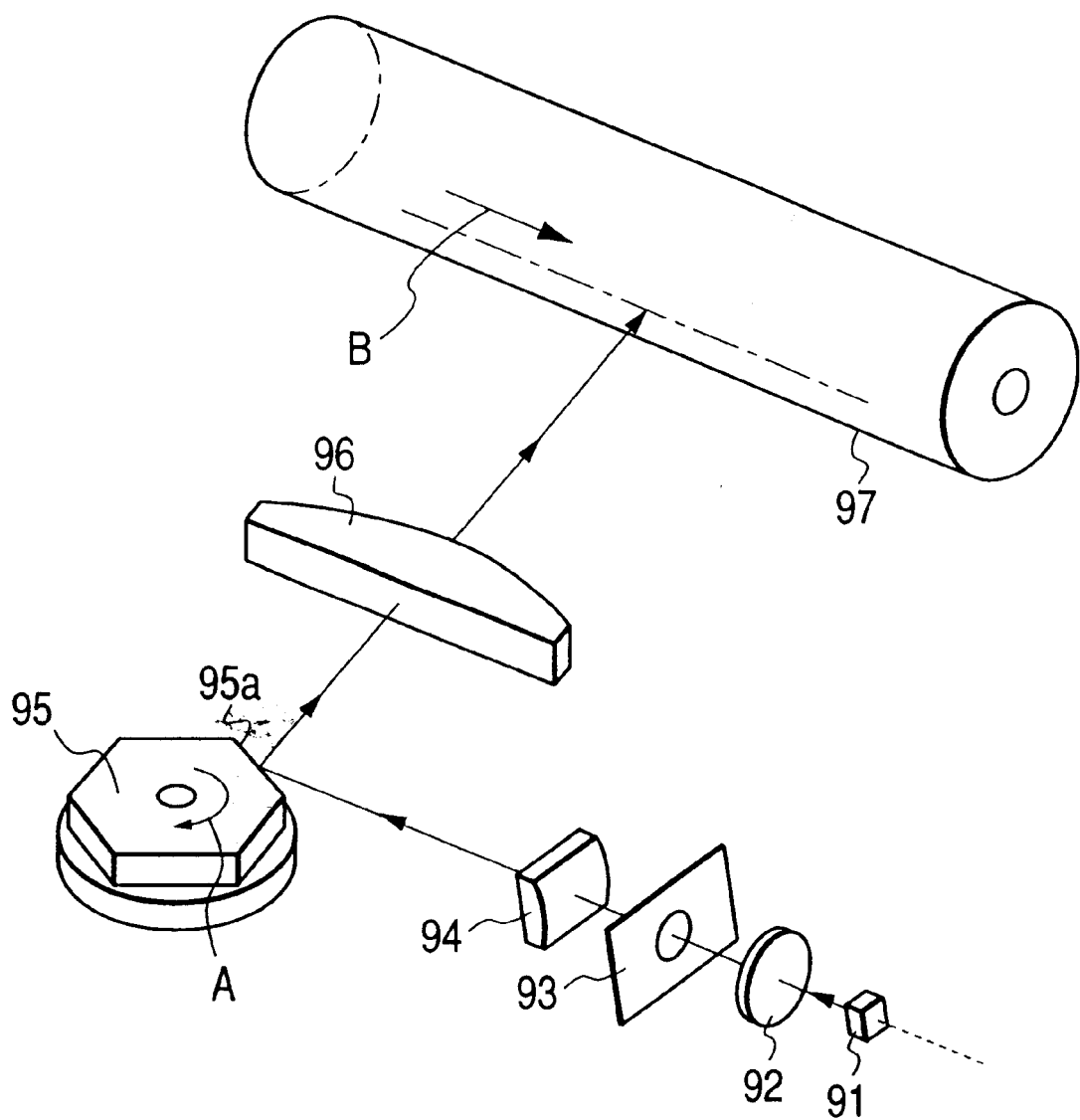
FIG. 1 is a schematic view showing the main part of a conventional scanning optical system.
Figure 2A:
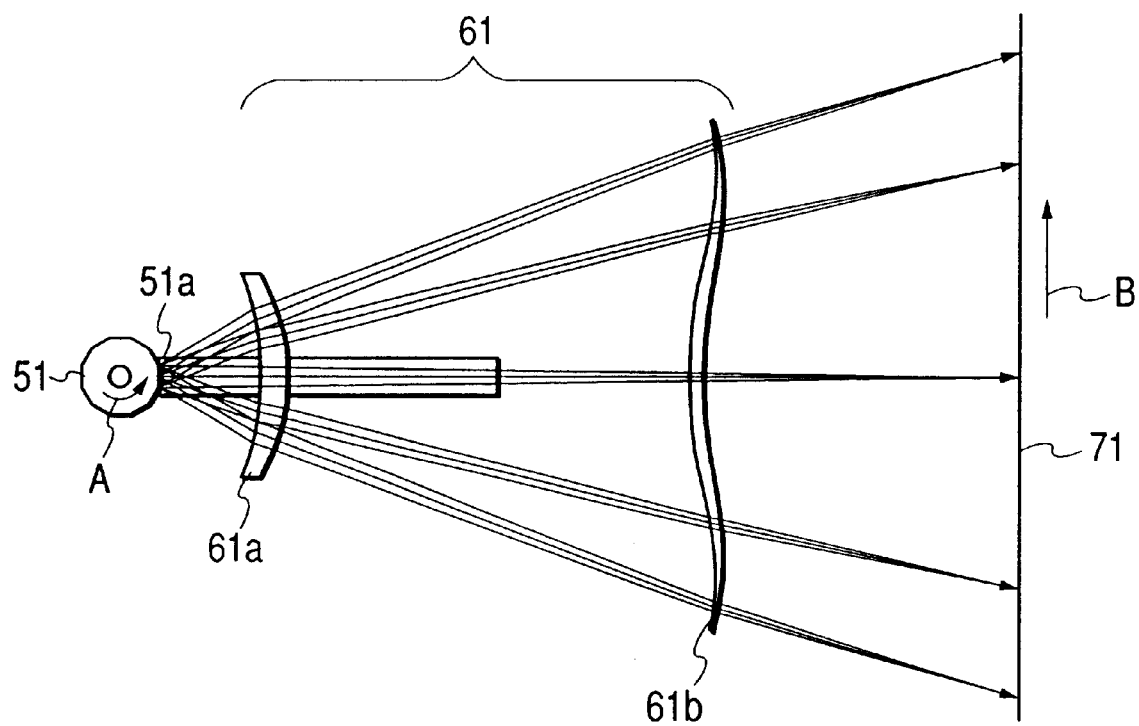
FIGS. 2A and 2B are sectional views of the first embodiment of the present invention in the main scanning and sub-scanning directions.
Figure 2B:
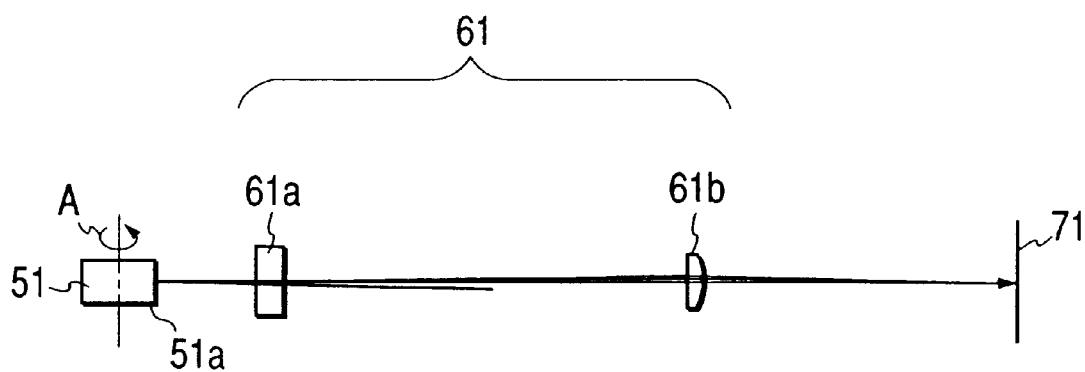

FIG. 2A is a sectional view (main scanning sectional view) showing the main part of a scanning optical system in the main scanning direction according to the first embodiment of the present invention in the main scanning direction when the system is applied to an image forming apparatus such as a laser beam printer or digital copying machine. FIG. 2B is a sectional view (sub-scanning sectional view) of the scanning optical system in FIG. 2A in the sub-scanning direction.

Referring to FIGS. 2A and 2B, a polygon mirror 51 serving as a light deflector (deflection means) is rotated by a driving means (not shown) such as a motor at a constant speed in the direction indicated by an arrow A. A second optical system 61 has f-θ characteristics. This optical system has two lenses sequentially arranged from the polygon mirror 51 side, namely a first lens (cylindrical lens) 61a having a positive power in a direction corresponding to the main scanning direction and a second lens (aspherical lens) 61b having a positive power along a light beam. The shape of the second optical system 61 will be described later. The first lens 61a in this embodiment also has the function (partly) of the first optical system to be described later. The second lens 61b is located closer to a scanned surface 71 than the other lens. In the embodiment, the imaging magnification of the second optical system 61 in the sub-scanning direction is set to 1 or less. The scanned surface 71 is a photosensitive drum surface.

Although not shown in FIGS. 2A and 2B, a semiconductor laser is used as a light source. The first optical system comprises a condenser lens (collimator lens) consisting of a planoconvex lens having a convex surface as an incident surface and a plain surface as an exit surface, an aperture stop (slit) for shaping a beam by restricting a passing light beam, an incident-side cylindrical lens having a power in a direction corresponding to the sub-scanning direction, and the first lens 61a. In a main scanning cross-section, the two lenses (i.e., the condenser lens and first lens 61a) constitute a collimator system.

Note that in this specification, the main scanning direction is the direction in which a light beam is scanned by the light deflector, and the sub-scanning direction is a direction perpendicular to both the direction in which the light beam reflected by the light deflector travels and the main scanning direction. In this case, in particular, the sub-scanning direction is the direction in which a light beam propagating toward the center of an effective scanning area is deflected/reflected. In addition, the main scanning and the sub-scanning corresponding directions are directions respectively corresponding to directions parallel to the main and sub-scanning directions on an imaginary optical path linearly developed from an optical path from the light source to the scanned surface along a light beam propagating toward the center of the effective scanning area. A radius of curvature and its sign become positive in the traveling direction of a light beam. As will be described later, in the second optical system, therefore, when the center of curvature of the surface shape is located closer to the light deflector than the surface vertex, the above values become negative, whereas when the center of curvature is located closer to the scanned surface, the above values become positive. A curvature is the reciprocal of a radius of curvature.

In this embodiment, the optically modulated light beam emitted by the semiconductor laser (not shown) is converted into a divergent light beam by the condenser lens. This light beam is restricted by the aperture stop and is incident on the incident-side cylindrical lens. Of the light beam incident on this cylindrical lens, a light beam in the sub-scanning cross-section converges and is incident on a deflection surface (deflection/reflection surface) 51a of the light deflector 51 through the first lens 61a to form a substantially linear image (a linear image elongated in the main scanning direction) near the deflection surface 51a. The light beam thus incident on the deflection surface 51a is incident on the deflection surface, in the sub-scanning cross-section including the rotation axis of the polygon mirror 51 and the optical axis of the second optical system 61, at a small oblique incident angle α=1° with respect to a plane (rotation plane of the polygon mirror 51) perpendicular to the rotation axis of the polygon mirror 51. The light beam in the divergent state in the main scanning cross-section passes through the first lens 61 to be converted into a substantially collimated light beam and strikes the deflection surface 51a from substantially the center of the deflection angle of the polygon mirror 51. The width of this substantially collimated light beam is set to be sufficiently larger than the facet width of the deflection surface 51a of the polygon mirror 51 in the main scanning direction. The light beam deflected/reflected by the light deflector 51 is guided onto the photosensitive drum surface 71 through the second optical system 61 and scanned on the photosensitive drum surface 71 in the direction indicated by an arrow B (main scanning direction) by rotating the polygon mirror 51 in the direction indicated by the arrow A. As a consequence, an image is recorded on the photosensitive drum surface 71 serving as a recording medium.

Each of the shapes of the first and second lenses 61a and 61b forming the second optical system 61 in this embodiment can be expressed as follows, provided that the intersection between each lens surface and the optical axis is regarded as an origin, and the optical axis direction, the direction perpendicular to the optical axis within the main scanning cross-section, and the direction perpendicular to the optical axis within the sub-scanning cross-section respectively correspond to the X-axis, the Y-axis, and the Z-axis. The lens shape in the generating-line direction corresponding to the main scanning direction is given by:

$$x = \frac{Y^2/R}{1+(1-(1+K)(Y/R)^2)^{1/2}} + B_4Y^4 + B_6Y^6 + B_8Y^8 + B_{10}Y^{10}$$

where R is the radius of curvature, and K, $B_4$, $B_6$, $B_8$, and $B_{10}$ are aspherical coefficients. The lens shape in the meridian-line direction corresponding to the sub-scanning direction is given by:

$$S = \frac{Z^2/r'}{1+(1-(Z-r')^2)^{1/2}}$$

for $1/r' = D_2Y^2 + D_4Y^4 + D_6Y^6 + D_8Y^8 + D_{10}Y^{10}$ Table 1 and Table 2 show an optical configuration and the aspherical coefficients of the first and second lenses 61a and 61b in this embodiment.

TABLE 1

Scanning Optical System of First Embodiment

| | | |
|---|---|---|
| Wavelength Used | (nm) | 655 |
| Scanning Width | (mm) | 325.2 |
| Maximum Field Angle | (deg) | ±27 |
| f-θ Coefficient | (mm/rad) | 345.05 |
| Scanning Efficiency | (%) | 90 |
| Oblique Incident Angle of Incident Light Beam | (deg) | 1 |
| Refractive Index of First Lens | | 1.51389 |
| Refractive Index of Second Lens | | 1.52757 |
| Circumscribed Circle Diameter of Polygon Mirror | (mm) | 36 |
| Number of Reflection/Deflection Surfaces of Polygon Mirror | (surface) | 12 |
| Width of One Surface of Polygon Mirror (Main Scanning Direction) | (mm) | 9.32 |
| Distance (Deflection Surface to First Surface of First Lens) | (mm) | 49.75 |
| Central Thickness of First Lens | (mm) | 14.49 |
| Distance (Second Surface of First Lens to First Surface of Second Lens) | (mm) | 264.24 |
| Central Thickness of Second Lens | (mm) | 8.00 |
| Distance (Second Surface of Second Lens to Scanned Surface) | (mm) | 157.90 |
| Horizontal Decentering Amount of Second Lens Relative to Rotating Plane | (mm) | 3.00 |

TABLE 2

| First Surface | | Second Surface | |
|---|---|---|---|
| Shape in Generating-line Direction | Shape in Generating-line Direction | Shape in Generating-line Direction | Shape in Generating-line Direction |
| R −2.08888E + 02 | R −1.01443E + 02 | R 2.05625E + 02 | R 2.29121E + 02 |
| K 0.00000E + 00 | K 0.00000E + 00 | K 8.67284E − 01 | K 1.28111E + 00 |
| B4 0.00000E + 00 | B4 0.00000E + 00 | B4 −1.36700E − 07 | B4 −1.45330E − 07 |
| B6 0.00000E + 00 | B6 0.00000E + 00 | B6 1.82988E − 12 | B6 1.74547E − 12 |
| B8 0.00000E + 00 | B8 0.00000E + 00 | B8 −1.88537E − 16 | B8 −1.60887E − 16 |
| B10 0.00000E + 00 | B10 0.00000E + 00 | B10 3.15376E − 22 | B10 −7.32867E − 22 |
| Shape in Meridian-line Direction | Shape in Meridian-line Direction | Shape in Meridian-line Direction | Shape in Meridian-line Direction |
| r ∞ | r ∞ | r ∞ | r −5.22109E + 01 |
| D2 0.00000E + 00 | D2 0.00000E + 00 | D2 0.00000E + 00 | D2 1.91623E − 05 |
| D4 0.00000E + 00 | D4 0.00000E + 00 | D4 0.00000E + 00 | D4 −2.71883E − 09 |
| D6 0.00000E + 00 | D6 0.00000E + 00 | D6 0.00000E + 00 | D6 1.65273E − 13 |
| D8 0.00000E + 00 | D8 0.00000E + 00 | D8 0.00000E + 00 | D8 −9.01664E − 18 |
| D10 0.00000E + 00 | D10 0.00000E + 00 | D10 0.00000E + 00 | D10 3.70666E − 22 |

The optical axis of the first lens 61a in this embodiment is located within a rotating plane which includes a linear image formed near the polygon mirror 51 by the incident-side cylindrical lens (not shown) and is perpendicular to the rotational axis of the polygon mirror 51. The optical axis of the second lens 61b is parallel to the rotating plane of the polygon mirror 51. The second lens 61b is translated above the rotating plane by 3 mm in a direction perpendicular to the plane. The optical axes of the first and second lenses 61a and 61b are located within the same sub-scanning cross-section as that of the principal ray of a light beam propagating toward the center of the effective scanning area of the scanned surface 71.

The first lens 61a has a positive power in the direction corresponding to the main scanning direction, as described above, and is made of a glass material (glass lens) to have a meniscus shape with a concave surface facing the polygon mirror 51.

The second lens 61b has a positive power along a light beam, as described above, and is made of a plastic material (plastic lens). Two surfaces in the generating-line direction of the second lens 61b which correspond to the main scanning direction have non-arcuated shapes each having a radius of curvature, along the main scanning direction, which gradually increases from an on-axis point toward a point near the middle point between the on-axis position and the peripheral portion, with the sign of the curvature being inverted from positive to negative near the middle point, and the absolute value of the radius of curvature gradually decreasing toward the peripheral portion. That is, the curvature of the second lens 61b along the main scanning direction gradually decreases from the on-axis position to the peripheral portion, and the sign of the curvature is inverted from positive to negative near the middle point. This shape, in particular, has the effect of correcting the remaining distortion that cannot be corrected by the first lens 61a. Since the radius of curvature of the incident surface is always larger than that of the exit surface, even if the signs of the curvatures of the two surfaces are inverted, the second lens 61b always has a positive power with respect to a light beam at any field angle. This also makes the lens have the effect of correcting the curvature of field in the main scanning direction.

Figure 3:
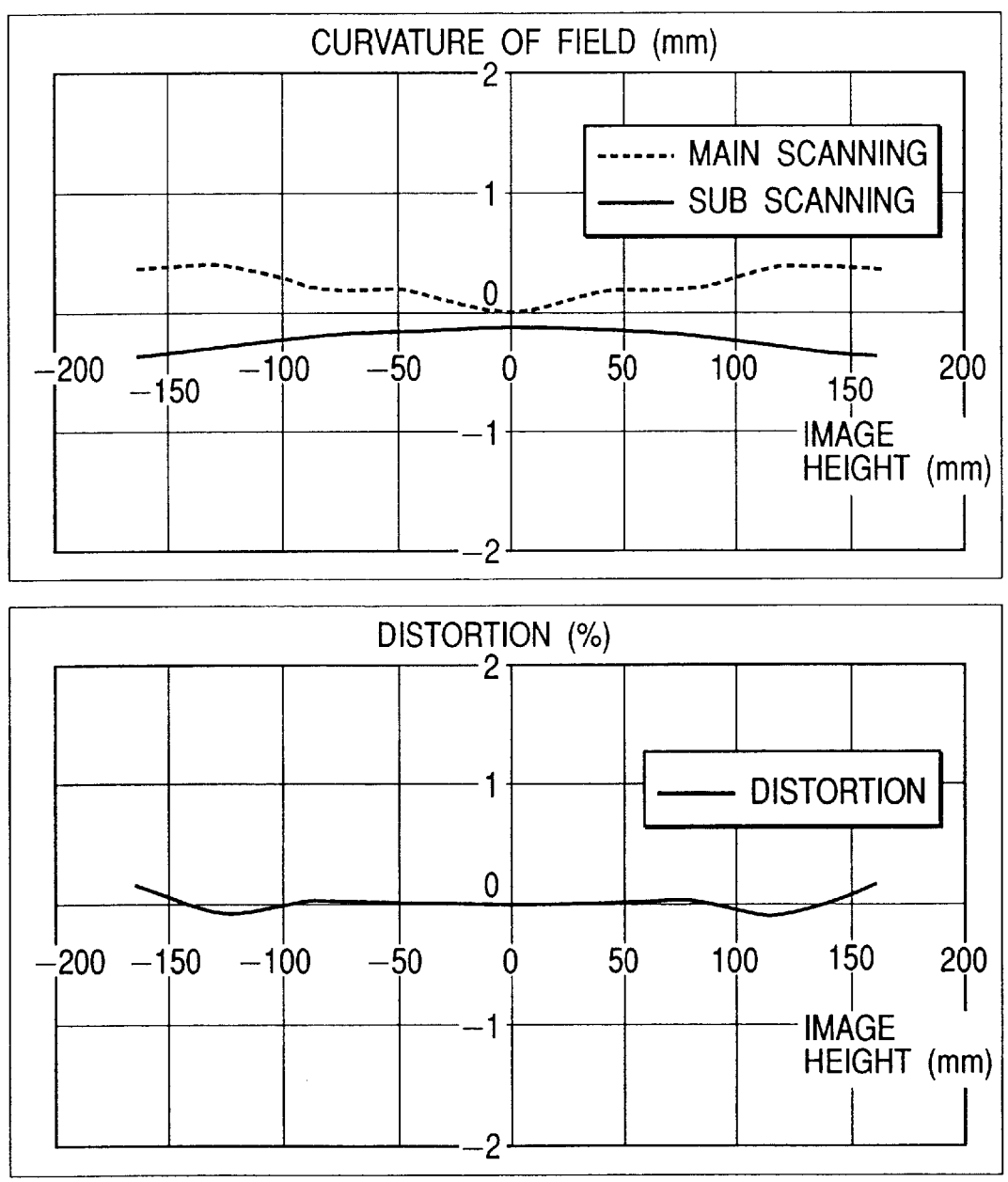
FIG. 3 is a graph showing the curvature of field and distortion in the first embodiment of the present invention.

Each of two surfaces in the meridian-line direction of the second lens 61b which corresponds to the sub-scanning direction is shaped such that the beam incident surface on the beam incident side is flat, and the exit surface on the beam exit side has a radius of curvature that gradually increases in negative value toward the peripheral portion of the lens, temporarily takes an extreme value near the middle point between the on-axis position and the peripheral portion, gradually decreases in negative value, takes an extreme value again near a 70% position, and gradually increases in negative value up to the peripheral portion. This change in the radius of curvature of each surface in the meridian-line direction serves in the meridian-line direction to correct the curvature of field in the main scanning direction as well as the curvature of field in the sub-scanning direction for the following reasons. Since a light beam is incident on the deflection surface of the polygon mirror 51 at an angle of 1°, the light beam reaches the second lens 61b at different heights depending on the scanning field angle, and the refraction of the light beam in the main scanning direction is not determined by the shape in the generating-line direction alone, but is greatly influenced by the radius of curvature in the main scanning direction at the light beam reaching position which is formed by the shape in the meridian-line direction extending from the generating-line in the direction of height of the lens (sub-scanning direction). The surface shape of the first and second lenses 61a and 61b are determined such that the incident angles at the light beam reaching positions on the first and second lenses correspond to desired imaging positions in both the main scanning and sub-scanning directions. In other words, even in an optical system subjected to large pupil movement, e.g., an over-field optical system, surface shapes for simultaneously correcting both curvature of field and distortion are formed by non-arcuated generating-line surfaces and changing the radii of curvature of meridian-line surfaces. FIG. 3 shows the curvature of field and distortion in this case. As shown in FIG. 3, the curvature of field and distortion are properly corrected throughout the entire field angle range.

In this embodiment, a return mirror (not shown) having a flat surface is disposed behind the second lens 61b. With this return mirror, the light beam passing through the second optical system 61 can be freely controlled up to the scanned surface 71. According to the reflectance characteristics of the return mirror, the reflectance increases as the incident angle of a light beam increases. As described above, in the over-field optical system, since the deflection surface 51a of the polygon mirror 51 serves as a stop in the main scanning direction, when the normal of the deflection surface 51a tilts by θ with respect to an incident light beam upon rotation of the polygon mirror 51, the width of the light beam reflected by the deflection surface 51a decreases by COS θ. This indicates that the intensity of the reflected light beam decreases. In addition, the light amount distribution within the incident light beam is not uniform, and the light intensity decreases from the optical axis to the peripheral portion. Furthermore, since no antireflection coating is formed on the plastic lens, the transmittance of the second lens 61b changes depending on the incident angle of a light beam. For this reason, in this embodiment, the light intensity at the peripheral portion is increased to set a substantially uniform light intensity distribution as a whole by using the reflectance characteristics of the return mirror.

When a light beam emitted from the light source is made to strike the light deflection surface of the light deflector (polygon mirror) with the width of the light beam being larger than the width of the deflection surface in the main scanning direction, the light deflector can be made to have a larger number of surfaces and smaller size. However, since the deflection surface of the light deflector serves as a stop and pupil, the pupil position moves in the main scanning direction as the light deflector rotates. If the pupil position greatly moves depending on the scanning field angle, the shape of a lens surface that can set curvature of field and distortion to desired values is not a spherical surface that can be obtained with the radius of curvature on the axis but is a lens surface having a non-arcuated shape displaced from the spherical surface by a desired value.

In this embodiment, therefore, as described above, at least one of the lenses of the second optical system 61 has a surface with a non-arcuated generating-line corresponding to the main scanning direction. With this arrangement, even if the pupil position moves owing to the scanning field angle, the non-arcuated surface displaced from an arcuated shape serving as a reference owing to the reaching position of a light beam corrects the curvature of field and distortion to desired values with the curvature and tilt of the surface shape, thereby always obtaining high image quality.

In addition, by forming a plurality of non-arcuated surfaces, the curvature of field and distortion can be reduced to almost 0. In this embodiment, since the second optical system 61 is made up of a plurality of lenses, the degree of freedom in positioning increases. Since the second optical system 61 is constituted by transmission optical elements, the required surface precision is about ¼ that required by an optical system constituted by reflection optical elements. Furthermore, a reduction in cost can be attained.

In this embodiment, at least one of the lenses of the second optical system 61 has a radius of curvature in the sub-scanning direction which changes along the main scanning direction irrespective of the generating-line corresponding thereto. With this arrangement, even if the pupil position moves owing to the scanning field angle, the curvature of field in the sub-scanning direction can be properly corrected. In addition, since a surface shape in the meridian-line direction is determined irrespective of the surface shape in the generating-line direction, the surface shape of a lens which can simultaneously correct the curvatures of field in the main scanning and sub-scanning directions can be set. If a plurality of surfaces whose radii of curvature in the sub-scanning direction change are formed, the curvature of field can be corrected more properly.

In this embodiment, as described above, a light beam emitted by the light source means is made to strike the deflection surface 51*a* of the light deflector 51 at a predetermined angle in the sub-scanning direction, and the imaging magnification of the second optical system 61 in the sub-scanning direction is set to 1 or less.

In the over-field optical system, since the deflection surface of the light deflector serves as a stop in the main scanning direction, the spot diameter in the main scanning direction is determined by the width of the deflection surface of the light deflector in the rotational direction. In this case, when a light beam is made to obliquely strike the deflection surface at a predetermined angle with respect to the deflecting scanning surface to be incident on the light deflector, the width of the light beam deflected/reflected by the light deflector greatly changes asymmetrically owing to the field angle. This may affect the image quality.

In this embodiment, to suppress asymmetry and a change in spot diameter owing to the scanning field angle, the first lens 61*a* is positioned at a given angle with respect to the deflection surface 51*a* such that the principal ray of a light beam incident on the light deflector 51 comes in a plane including the optical axis of the second optical system 61 and the rotation axis of the light deflector 51. At this time, since the second optical system 61 is made up of a plurality of lenses, the incident angle of a light beam on the deflection surface 51*a* can be set to be small.

In this embodiment, the first optical system includes a collimator system having at least one lens for making a light beam emitted by the light source strike, as a substantially parallel light beam, the light deflector, a cylindrical lens system having at least one lens that has a predetermined power in the direction corresponding to the sub-scanning direction to form a linear image elongated in the direction corresponding to the main scanning direction in the vicinity of the deflection surface of the light deflector, and an aperture stop for determining a spot diameter in the sub-scanning direction.

In the second optical system 61, the tilt correction lens as the second lens for setting the deflection surface 51*a* of the light deflector 51 and the scanned surface 71 conjugate with each other is positioned closer to the scanned surface 71 than the middle point between the light deflector 51 and the scanned surface 71. In this case, since a light beam is incident on the deflection surface at a desired angle, when the deflection surface tilts due to the fitting backlash of the light deflector, the tilt of the rotation axis, or the like, and the position at which the light beam reaches the scanned surface changes in the sub-scanning direction, so that pitch irregularity appears on the resultant image.

In this embodiment, by setting an imaging magnification β of the second optical system 61 to 1 or less, the positional shift amount of a light beam that reaches the scanned surface 71 in the sub-scanning direction is reduced to a level at which no practical problem arises in terms of image quality.

Since a light beam is incident on the deflection surface 51*a* of the light deflector 51 at a predetermined angle, the light beam deflected/reflected by the light deflector 51 is pseudo-conically scanned. For this reason, a light beam reaches the tilt correction lens at different heights in the sub-scanning direction depending on the scanning field angle. In this embodiment, therefore, as described above, to set the deflection surface 51*a* and the scanned surface 71 conjugate with each other, the curvature of a meridian-line of the tilt correction lens (second lens) is changed depending on the scanning field angle so as to satisfy the requirement for the relationship between the jitter amount of the deflection surface, the light beam position on the lens, and the image plane position. With this arrangement, there are provided a scanning optical system and image forming apparatus using the scanning optical system, which uses an over-field optical system, can correct a deterioration in aberration due to the movement of the pupil unique to a case wherein a light beam is incident on the deflection surface at a predetermined angle, can suppress curvature of field and distortion in the main scanning and sub-scanning directions, and can always obtain high image quality without any noticeable pitch irregularity.

This embodiment uses the elongated lens (second lens) made of a plastic material for the second optical system 61, instead of a cylindrical mirror, and hence has a great merit in terms of cost.

Note that an optical path bending mirror may be disposed between the cylindrical lens of the first optical system and the light deflector to properly bend the optical path. This makes it possible to reduce the size of the incident optical system.

Figure 4A:
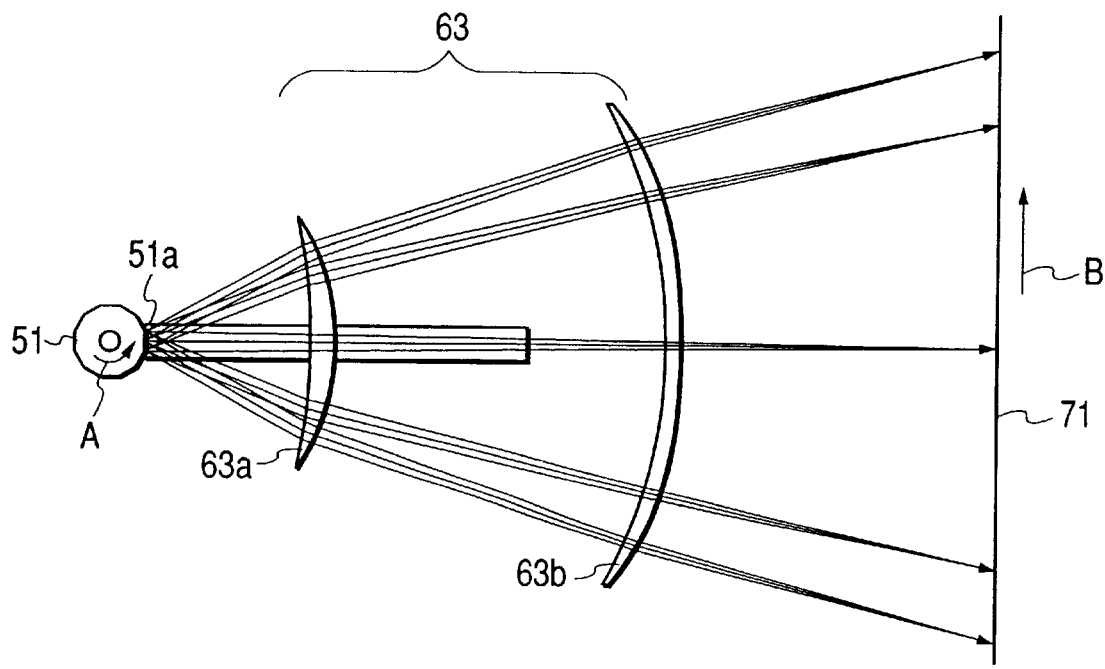
FIGS. 4A and 4B are sectional views of the second embodiment of the present invention in the main scanning and sub-scanning directions.
Figure 4B:
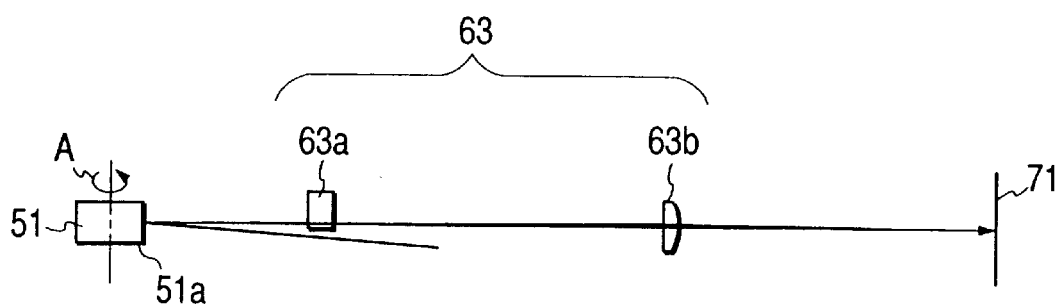

FIG. 4A is a sectional view (sub-scanning sectional view) showing the main part of a scanning optical system in the main scanning direction according to the second embodiment of the present invention which is applied to an image forming apparatus such as a laser beam printer or digital copying machine. FIG. 4B is a sectional view (sub-scanning sectional view) of the main part of the apparatus in the sub-scanning direction. The same reference numerals as in FIGS. 2A and 2B denote the same parts in FIGS. 4A and 4B.

This embodiment differs from the first embodiment in that a lower portion of the first lens of the second optical system is cut off to make the first lens have only the function of the second optical system, and the first and second lenses have different shapes. The remaining arrangement and optical function of the second embodiment are the same as those of the first embodiment. This allows the second embodiment to have the same effects as those of the first embodiment.

Referring to FIGS. 4A and 4B, a second optical system 63 includes has two lenses sequentially arranged from the polygon mirror 51 side, namely a first lens (cylindrical lens) 63*a* having a lower portion cut off and a positive power in a direction corresponding to the main scanning direction and a second lens (aspherical lens) 63*b* having a positive power and shape to be described later. The second lens 63*b* is located closer to the scanned surface 71 than the other lens.

Table 3 and Table 4 show an optical configuration and the aspherical coefficients of the first and second lenses 63a and 63b in this embodiment.

TABLE 3

Scanning Optical System of Second Embodiment

| | | |
|---|---|---|
| Wavelength Used | (nm) | 655 |
| Scanning Width | (mm) | 325.2 |
| Maximum Field Angle | (deg) | ±27 |
| f-θ Coefficient | (mm/rad) | 345.05 |
| Scanning Efficiency | (%) | 90 |
| Oblique Incident Angle of Incident Light Beam | (deg) | 2 |
| Refractive Index of First Lens | | 1.52757 |
| Refractive Index of Second Lens | | 1.52757 |
| Circumscribed Circle Diameter of Polygon Mirror | (mm) | 36 |
| Number of Reflection/Deflection Surfaces of Polygon Mirror | (surface) | 12 |
| Width of One Surface of Polygon Mirror (Main Scanning Direction) | (mm) | 9.32 |
| Distance (Deflection Surface to First Surface of First Lens) | (mm) | 90.00 |
| Central Thickness of First Lens | (mm) | 13.05 |
| Distance (Second Surface of First Lens to First Surface of Second Lens) | (mm) | 180.00 |
| Central Thickness of Second Lens | (mm) | 10.00 |
| Distance (Second Surface of Second Lens to Scanned Surface) | (mm) | 16.82 |

TABLE 4

First Lens

| First Surface Shape in Generating-line Direction | Second Surface Shape in Generating-line Direction |
|---|---|
| R −3.28213E+02 | R −1.19838E+02 |
| K 6.64507E+00 | K −6.35104E−01 |
| B4 2.13402E−09 | B4 −3.84218E−08 |
| B6 2.04770E−12 | B6 −4.37587E−13 |
| B8 −1.67237E−17 | B8 0.00000E+00 |
| B10 0.00000E+00 | B10 0.00000E+00 |

| Shape in Meridian-line Direction | Shape in Meridian-line Direction |
|---|---|
| r ∞ | r ∞ |
| D2 0.00000E+00 | D2 0.00000E+00 |
| D4 0.00000E+00 | D4 0.00000E+00 |
| D6 0.00000E+00 | D6 0.00000E+00 |
| D8 0.00000E+00 | D8 0.00000E+00 |
| D10 0.00000E+00 | D10 0.00000E+00 |

Second Lens

| First Surface Shape in Generating-line Direction | Second Surface Shape in Generating-line Direction |
|---|---|
| R −2.98943E+02 | R −2.78835E+02 |
| K −6.04406E−01 | K 1.36517E+00 |
| B4 −1.86149E−08 | B4 −2.08809E−08 |
| B6 −4.86392E−14 | B6 3.11491E−15 |
| B8 0.00000E+00 | B8 0.00000E+00 |
| B10 0.00000E+00 | B10 0.00000E+00 |

| Shape in Meridian-line Direction | Shape in Meridian-line Direction |
|---|---|
| r −1.55515E+06 | r −5.58260E+01 |
| D2 1.99783E+03 | D2 9.14182E−06 |
| D4 2.08800E+01 | D4 2.07961E−10 |
| D6 0.00000E+00 | D6 3.30320E−15 |
| D8 0.00000E+00 | D8 −1.12887E−21 |
| D10 0.00000E+00 | D10 0.00000E+00 |

In this embodiment, a light beam (substantially collimated light beam) incident from the first optical system onto a deflection surface 51a is incident, in a sub-scanning cross-section including the rotational axis of the polygon mirror 51 and the optical axis of the second optical system 63, at an oblique incident angle α=2° with respect to a plane (the rotation plane of the polygon mirror 51) perpendicular to the rotational axis of the polygon mirror 51.

In this embodiment, the optical axes of the first and second lenses 63a and 63b overlap on each other within the same sub-scanning cross-section as that of the principal ray of a light beam propagating toward the center of the effective scanning area of the scanned surface 71, and the lower portion of the first lens 63a is partly cut off to prevent interference with the optical path of an incident light beam.

As described above, the first lens 63a has a positive power in the direction corresponding to the main scanning direction, is made of a plastic material (plastic lens), and has a meniscus shape with a concave portion facing the polygon mirror 51. The generatrix incident surface of the first lens 63a in the generating-line direction on the incident side has a shape whose radius of curvature gradually decreases in absolute value from the optical axis to the peripheral portion and has a negative sign, whereas the exit surface in the generating-line direction on the exit side has a shape whose radius of curvature gradually increases in absolute value from the optical axis to the peripheral portion and has a negative sign. The absolute value of the radius of curvature of the exit surface is always smaller than that of the incident surface, and these absolute values take a negative sign. This indicates that the first lens 63a always has a positive power, and the power gradually decreases from the optical axis to the peripheral portion. This allows the first lens 63a to correct curvature of field and distortion, including pupil movement.

As described above, the second lens 63b has a positive power, is made of a plastic material (plastic lens), and has a meniscus shape with a concave portion facing the polygon mirror 51. Each of the incident and exit surfaces of the second lens 63b in the generating-line direction has a shape whose radius of curvature gradually decreases in absolute value from the optical axis to the peripheral portion and has a negative sign. In this embodiment, since the difference between the radii of curvature of the two surfaces hardly changes, the second lens 63b contributes to correction of distortion (f-θ characteristics), in particular.

Figure 5:
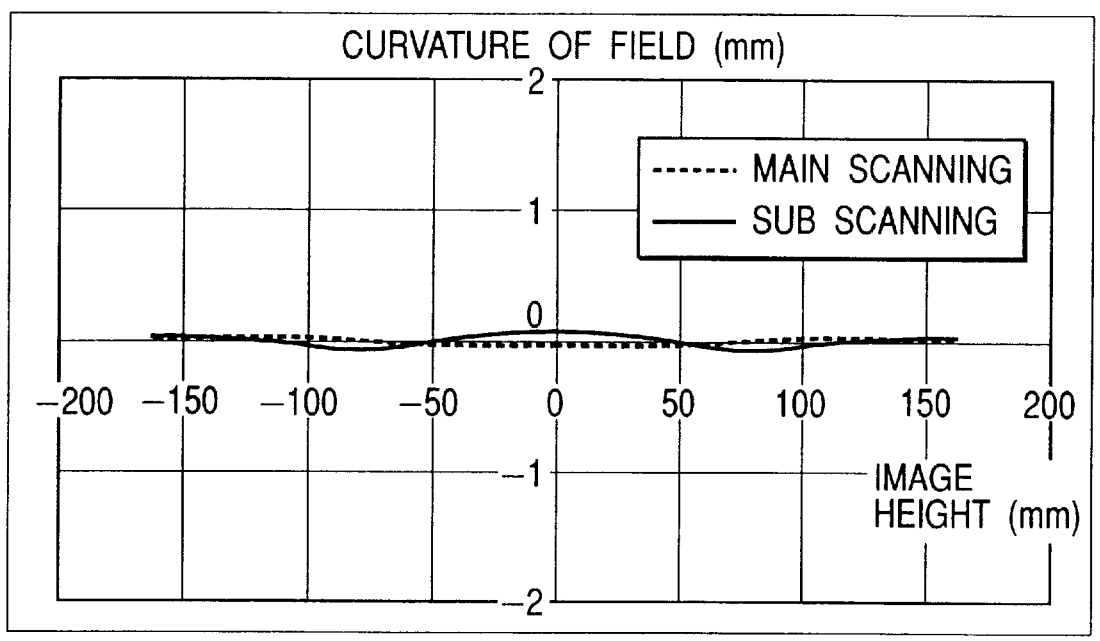
FIG. 5 is a graph showing the curvature of field and distortion in the second embodiment of the present invention.
Figure 5:
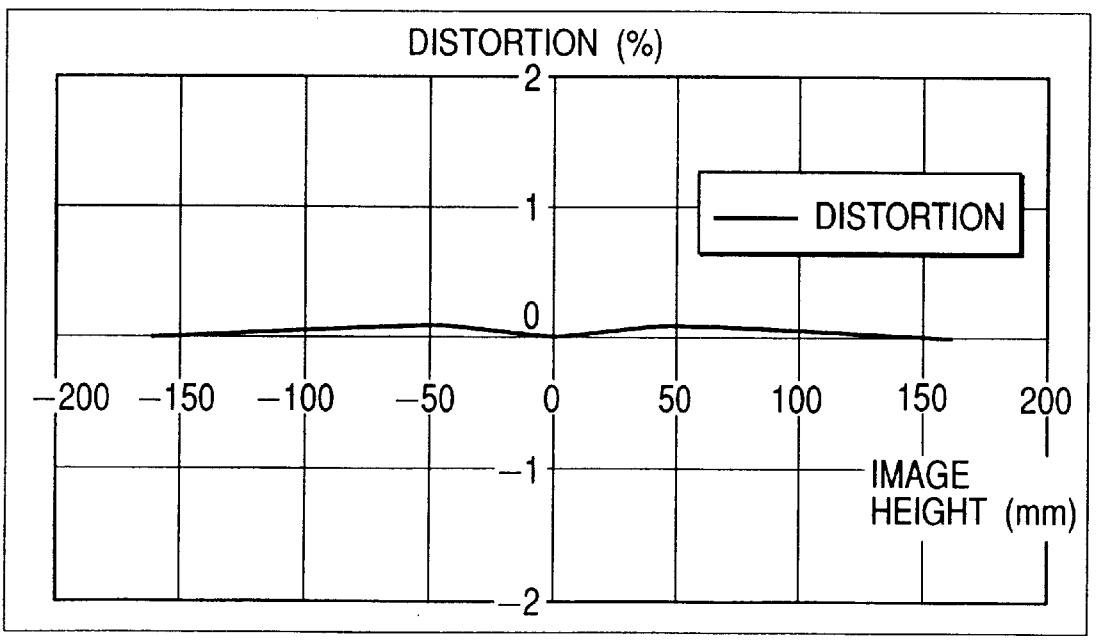

Each surface of the second lens 63b in the meridian-line direction has a meniscus shape with a concave portion facing the polygon mirror 51. The radii of curvature of the two surfaces of the second lines 63b in the meridian-line direction gradually increase in negative value from the optical axis on the generating-line to the peripheral portion. This arrangement mainly corrects the curvature of field in the sub-scanning direction. FIG. 5 shows the field of curvature and distortion in this case. As is obvious from FIG. 5, the curvature of field and distortion are properly corrected throughout the entire angle range.

Figure 6A:
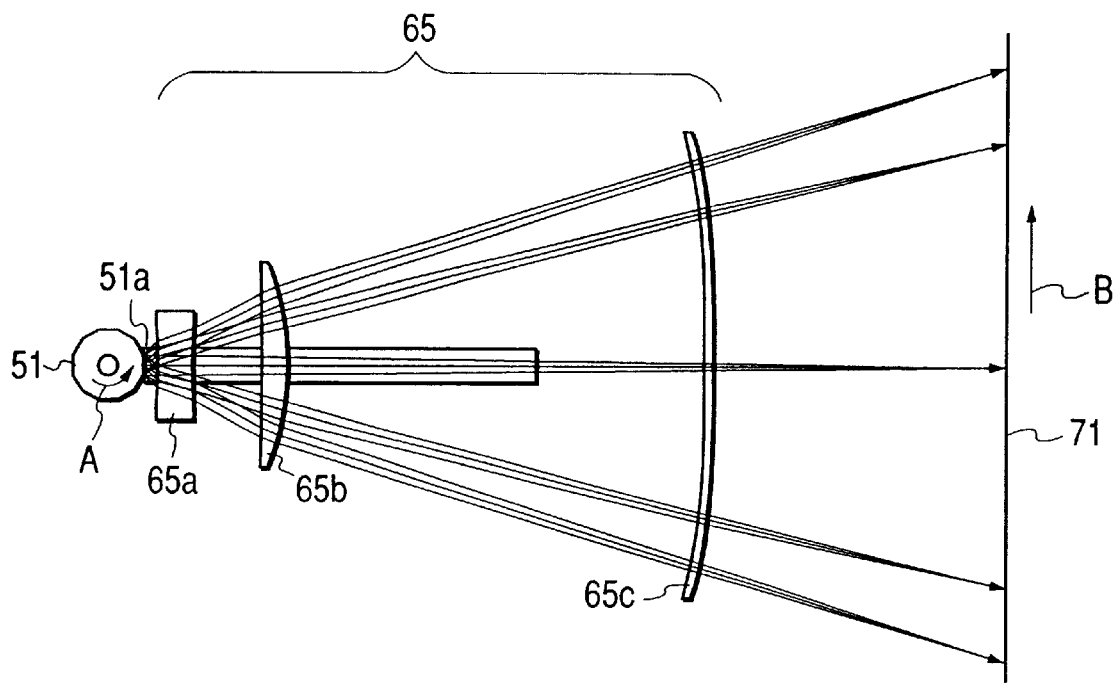
FIGS. 6A and 6B are sectional views of the third embodiment of the present invention in the main scanning and sub-scanning directions.
Figure 6B:
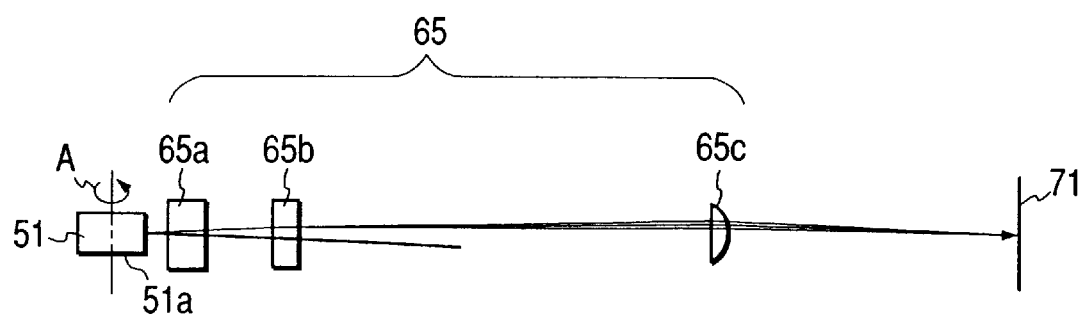

FIG. 6A is a sectional view (main scanning sectional view) showing the main part of a scanning optical device in the main scanning direction according to the third embodiment of the present invention which is applied to an image forming apparatus such as a laser beam printer or digital copying machine. FIG. 6B is a sectional view (sub-scanning sectional view) of the apparatus in the sub-scanning direction. The same reference numerals as in FIGS. 2A and 2B denote the same parts in FIGS. 6A and 6B.

This embodiment differs from the first embodiment in that a second optical system is made up of three lens, namely first, second, and third lenses, the first and second lenses of the three lenses also serve as a first optical system (partly), and the first, second, and third lenses have different shapes. The remaining arrangement and optical function are the same as those of the first embodiment.

Referring to FIGS. 6A and 6B, a second optical system 65 is comprises three lenses sequentially arranged from the polygon mirror 51 side, namely a first lens (cylindrical lens) 65a having a negative power in the direction corresponding to the main scanning direction, a second lens (cylindrical lens) 65b having a positive power in the direction corresponding to the main scanning direction, and a third lens (aspherical lens) 65c having a power mainly in the direction corresponding to the sub-scanning direction. The shape of the second optical system 65 will be described later. The third lens 65c is located closer to a scanned surface 71 than the remaining lenses.

Table 5 and Table 6 show an optical configuration and the aspherical coefficients of the first, second, and third lenses 65a, 65b, and 65c in this embodiment.

TABLE 5

Scanning Optical System of Third Embodiment

| | | |
|---|---|---|
| Wavelength Used | (nm) | 655 |
| Scanning Width | (mm) | 325.2 |
| Maximum Field Angle | (deg) | ±27 |
| f-θ Coefficient | (mm/rad) | 345.05 |
| Scanning Efficiency | (%) | 90 |
| Oblique Incident Angle of Incident Light Beam | (deg) | 1 |
| Refractive Index of First Lens | | 1.51389 |
| Refractive Index of Second Lens | | 1.79623 |
| Refractive Index of Third Lens | | 1.52757 |
| Circumscribed Circle Diameter of Polygon Mirror | (mm) | 36 |
| Number of Reflection/Deflection Surfaces of Polygon Mirror | (surface) | 12 |
| Width of One Surface of Polygon Mirror (Main Scanning Direction) | (mm) | 9.32 |
| Distance (Deflection Surface to First Surface of First Lens) | (mm) | 9.30 |
| Central Thickness of First Lens | (mm) | 18.35 |
| Distance (Second Surface of First Lens to First Surface of Second Lens) | (mm) | 37.05 |
| Central Thickness of Second Lens | (mm) | 13.65 |
| Distance (Second Surface of Second Lens to First Surface of Third Lens) | (mm) | 229.51 |
| Central Thickness of Third Lens | (mm) | 4.00 |
| Distance (Second Surface of Third Lens to Scanned Surface) | (mm) | 159.99 |

TABLE 6

| First Lens | | Second Lens | | Third Lens | |
|---|---|---|---|---|---|
| First Surface | Second Surface | First Surface | Second Surface | First Surface | Second Surface |
| Shape in Generating-line Direction | Shape in Generating-line Direction | Shape in Generating-line Direction | Shape in Generating-line Direction | Shape in Generating-line Direction | Shape in Generating-line Direction |
| R −2.16899E + 02 | R 3.50878E + 02 | R ∞ | R −1.67124E + | R −9.56671E + 02 | R −1.00967E + 03 |
| K 0.00000E + 00 | K 0.00000E + 00 | K 0.00000E + 00 | K 0.00000E + 00 | K −1.68879E − 07 | K 3.45534E − 07 |
| B4 0.00000E + 00 | B4 0.00000E + 00 | B4 0.00000E + 00 | B4 0.00000E + 00 | B4 9.60585E − 09 | B4 9.80036E − 09 |
| B6 0.00000E + 00 | B6 0.00000E + 00 | B6 0.00000E + 00 | B6 0.00000E + 00 | B6 −1.16594E − 12 | B6 −1.11713E − 12 |
| B8 0.00000E + 00 | B8 0.00000E + 00 | B8 0.00000E + 00 | B8 0.00000E + 00 | B8 0.00000E + 00 | B8 0.00000E + 00 |
| B10 0.00000E + 00 | B10 0.00000E + 00 | B10 0.00000E + 00 | B10 0.00000E + 00 | B10 0.00000E + 00 | B10 0.00000E + 00 |
| Shape in Meridian-line Direction | Shape in Meridian-line Direction | Shape in Meridian-line Direction | Shape in Meridian-line Direction | Shape in Meridian-line Direction | Shape in Meridian-line Direction |
| r ∞ | r ∞ | r ∞ | r ∞ | r −3.07747E + 01 | r −2.05064E + 01 |
| D2 0.00000E + 00 | D2 0.00000E + 00 | D2 0.00000E + 00 | D2 0.00000E + 00 | D2 8.60299E − 06 | D2 7.93250E − 6 |
| D4 0.00000E + 00 | D4 0.00000E + 00 | D4 0.00000E + 00 | D4 0.00000E + 00 | D4 0.00000E + 00 | D4 9.62733E − 12 |
| D6 0.00000E + 00 | D6 0.00000E + 00 | D6 0.00000E + 00 | D6 0.00000E + 00 | D6 0.00000E + 00 | D6 0.00000E + 00 |
| D8 0.00000E + 00 | D8 0.00000E + 00 | D8 0.00000E + 00 | D8 0.00000E + 00 | D8 0.00000E + 00 | D8 0.00000E + 00 |
| D10 0.00000E + 00 | D10 0.00000E + 00 | D10 0.00000E + 00 | D10 0.00000E + 00 | D10 0.00000E + 00 | D10 0.00000E + 00 |

In this embodiment, a light beam (substantially collimated light beam) incident from the first optical system onto a deflection surface 51a is incident, in a sub-scanning cross-section including the rotational axis of the polygon mirror 51 and the optical axis of the second optical system 65, at an oblique incident angle $\alpha=1°$ with respect to a plane (the rotation plane of the polygon mirror 51) perpendicular to the rotational axis of the polygon mirror 51.

In this embodiment, the optical axes of the first, second, and third lenses 65a, 65b, and 65c overlap each other within the same sub-scanning cross-section as that of the principal ray of a light beam propagating toward the center of the effective scanning area of the scanned surface 71.

As described above, the first lens 65a has a negative power in the direction, is made of a glass material (glass lens), and has a meniscus shape with a concave portion facing the polygon mirror 51. As described above, the second lens 65b has a positive power in the direction corresponding to the main scanning direction and is made of glass material (glass lens). As described above, the third lens 65c has a predetermined power mainly in the direction corresponding to the sub-scanning direction and is made of a plastic material (plastic lens). Third lens 65c is an elongated aspherical lens located near the scanned surface 71.

In this embodiment, the first and second lenses 65a and 65b are made to have main powers in the main scanning direction to reduce the focus shift due to environmental changes (temperature change, in particular).

Figure 7:
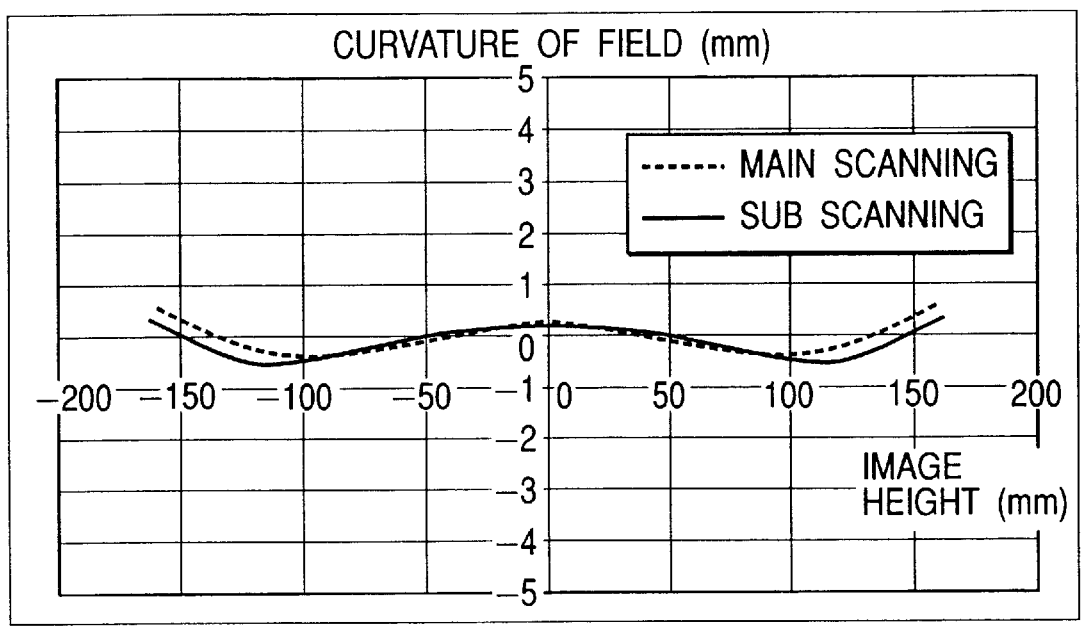
FIG. 7 is a graph showing the curvature of field and distortion in the third embodiment of the present invention.
Figure 7:
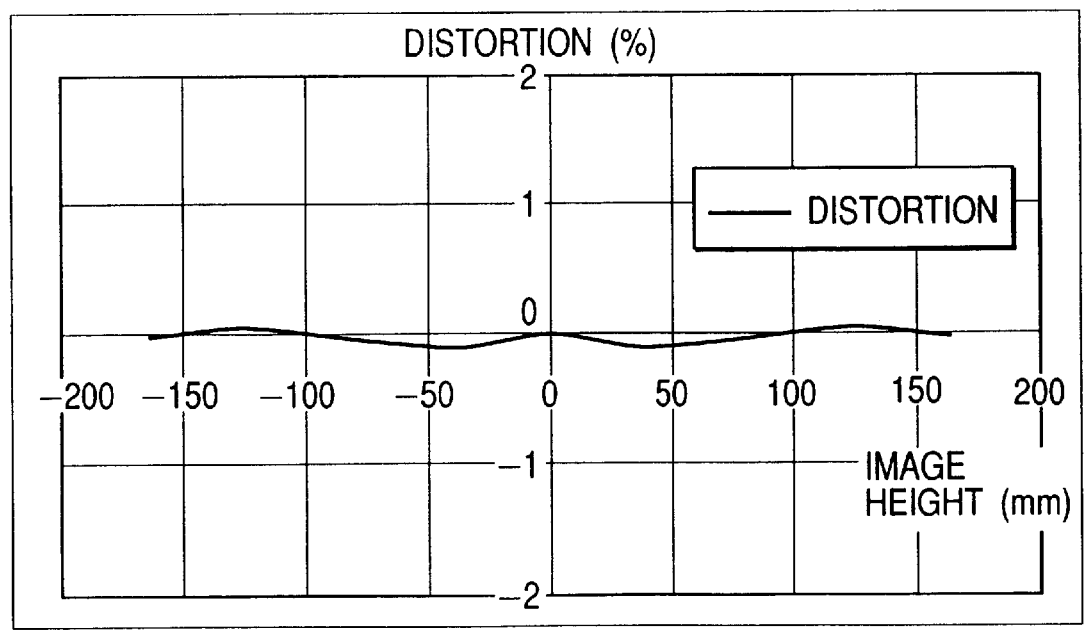

The incident surface of the third lens 65c in the meridian-line direction on the incident side is flat, and the exit surface in the meridian-line direction on the exit side has a shape whose radius of curvature gradually increases in absolute value from the optical axis on the generating-line to the peripheral portion and has a negative sign. This shape serves to correct the curvature of field in the sub-scanning direction at each image height (field angle). Each of the radii of curvature of the two surfaces of the third lens 65c in the generating-line direction always takes a negative sign, gradually increases in absolute value from the optical axis to the peripheral portion, takes an extreme value at a lens height near a 30% position, and gradually decreases in absolute value toward the peripheral portion. The difference in radius of curvature between the respective surfaces of the third lens 65c hardly changes at any lens height. With the surface shape formed by the generating-line and the meridian-lines extending perpendicular to the generating-line, along the main scanning direction with respect to light beam, the remaining distortion that cannot be corrected by the first and second lenses 65a and 65b can be corrected. FIG. 7 shows the curvature of field and distortion at this time. As is obvious from FIG. 7, the curvature of field and distortion can be properly corrected throughout the entire field angle range.

Figure 8A:
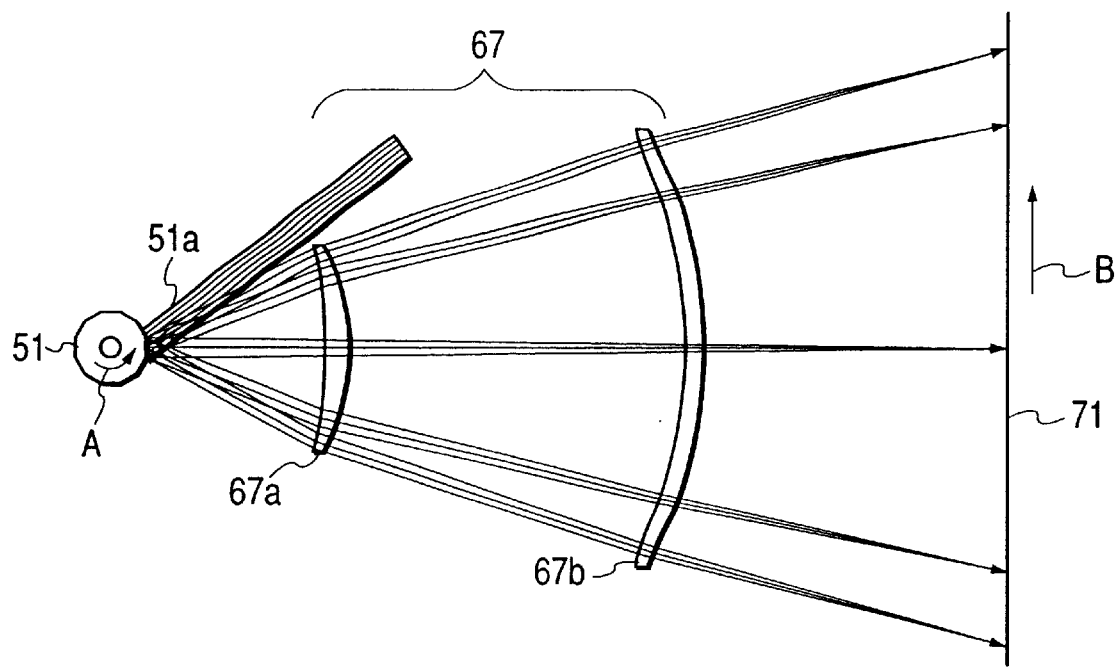
FIGS. 8A and 8B are sectional views of the fourth embodiment of the present invention in the main scanning and sub-scanning directions.
Figure 8B:
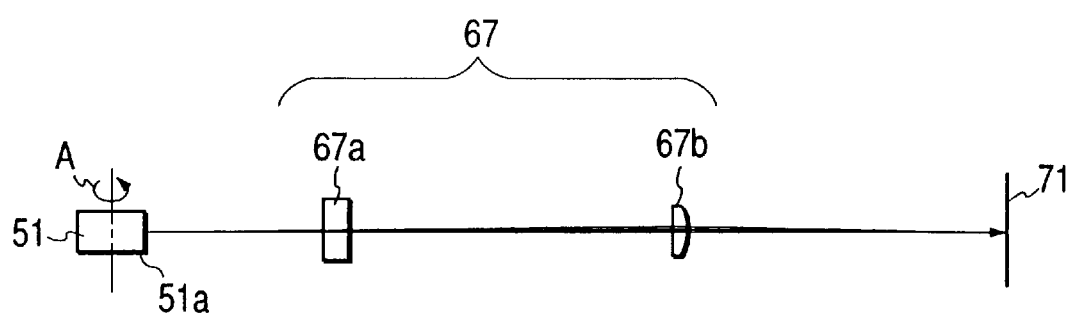

FIG. 8A is a sectional view (main scanning sectional view) showing the main part of a scanning optical system in the main scanning direction according to the fourth aspect of the present invention which is applied to an image forming apparatus such as a laser beam laser or digital copying machine. FIG. 8B is a sectional view (sub-scanning sectional view) of the apparatus in the sub-scanning direction. The same reference numerals in FIGS. 2A and 2B denote the same parts in FIGS. 8A and 8B.

This embodiment differs from the first embodiment in that a first optical system, light deflector, and second optical system are disposed within the same plane (deflection scan surface), a light beam emitted by a light source means is incident on the deflection scan surface of the light deflector at a predetermined angle with respect to the deflection scan surface, thus forming a so-called deflection incident system. In addition, the first and second lenses of a second optical system have different shapes. The remaining arrangement and optical function are substantially the same as those of the first embodiment. With this arrangement, the same effects as those of the first embodiment can be obtained.

Referring to FIGS. 8A and 8B, a second optical system 67 includes two lenses sequentially arranged from the polygon mirror 51 side, namely a first lens (cylindrical lens) 67a having a positive power in the direction corresponding to the main scanning direction and a second lens (aspherical lens) 67b having a positive power. The shape of the second optical system 67 will be described later. The second lens 67b is located closer to a scanned surface 71 than the remaining lens.

Table 7 and Table 8 have an optical configuration and the aspherical coefficients of the first and second lenses 67a and 67b.

TABLE 7

| Scanning Optical System of Second Embodiment | | |
|---|---|---|
| Wavelength Used | (nm) | 655 |
| Scanning Width | (mm) | 325.2 |
| Maximum Field Angle | (deg) | ±27 |
| f-θ Coefficient | (mm/rad) | 345.05 |
| Scanning Efficiency | (%) | 90 |
| Angle Defined by Incident Light Beam and Second Imaging Optical System | (deg) | 40 |
| Refractive Index of First Lens | | 1.52757 |
| Refractive Index of Second Lens | | 1.52757 |
| Circumscribed Circle Diameter of Polygon Mirror | (mm) | 36 |
| Number of Reflection/Deflection Surfaces of Polygon Mirror | (surface) | 12 |
| Width of One Surface of Polygon Mirror (Main Scanning Direction) | (mm) | 9.32 |
| Distance (Deflection Surface to First Surface of First Lens) | (mm) | 90.00 |
| Central Thickness of First Lens | (mm) | 13.05 |
| Distance (Second Surface of First Lens to First Surface of Second Lens) | (mm) | 180.00 |
| Central Thickness of Second Lens | (mm) | 10.00 |
| Distance (Second Surface of Second Lens to Scanned Surface) | (mm) | 168.23 |

TABLE 8

First Lens

| First Surface | | Second Surface | |
|---|---|---|---|
| Shape in Generating-line Direction on Near Side | Shape in Generating-line Direction on Far Side | Shape in Generating-Direction on Near Side | Shape in Generating-line Direction on Far Side |
| R −2.97191E + 02 | R −2.97191E + 02 | R −1.14892E + 02 | R −1.14892E + 02 |
| K 6.31920E + 00 | K −1.25932E + 00 | K −6.54838E − 01 | K −4.93274E − 01 |
| B4 5.32882E − 08 | B4 −1.52977E − 07 | B4 8.09870E − 09 | B4 −1.11692E − 07 |
| B6 −5.17670E − 12 | B6 1.96811E − 11 | B6 −5.32109E − 12 | B6 1.22935E − 12 |
| B8 −4.67834E − 17 | B8 −4.85834E − 16 | B8 −1.62866E − 15 | B8 −5.43268E − 16 |
| B10 −2.20356E − 19 | B10 −7.00901E − 19 | B10 4.67244E − 20 | B10 −1.40941E − 19 |
| Shape in Meridian-line Direction on Near Side | Shape in Meridian-line Direction on Far Side | Shape in Meridian-line Direction on Near Side | Shape in Meridian-line Direction on Far Side |
| r ∞ | r ∞ | r ∞ | r ∞ |
| D2 0.00000E + 00 | D2 0.00000E + 00 | D2 0.00000E + 00 | D2 0.00000E + 00 |
| D4 0.00000E + 00 | D4 0.00000E + 00 | D4 0.00000E + 00 | D4 0.00000E + 00 |
| D6 0.00000E + 00 | D6 0.00000E + 00 | D6 0.00000E + 00 | D6 0.00000E + 00 |
| D8 0.00000E + 00 | D8 0.00000E + 00 | D8 0.00000E + 00 | D8 0.00000E + 00 |
| D10 0.00000E + 00 | D10 0.00000E + 00 | D10 0.00000E + 00 | D10 0.00000E + 00 |

Second Lens

| First Surface | | Second Surface | |
|---|---|---|---|
| Shape in Generating-line Direction on Near Side | Shape in Generating-line Direction on Far Side | Shape in Generating-line Direction on Near Side | Shape in Generating-line Direction on Far Side |
| R −2.81732E + 02 | R −2.81732E + 02 | R −2.79380E + 02 | R −2.79380E + 02 |
| K −9.51624E − 01 | K −1.86102E − 01 | K 1.52212E + 00 | K 1.08114E + 00 |
| B4 −6.87744E − 08 | B4 −3.78147E − 08 | B4 −8.59772E − 08 | B4 −6.64916E − 08 |
| B6 4.91293E − 12 | B6 3.91111E − 12 | B6 5.60208E − 12 | B6 5.60082E − 12 |
| B8 2.08510E − 20 | B8 9.03403E − 17 | B8 −1.23912E − 20 | B8 −1.01470E − 17 |
| B10 −2.26116E − 29 | B10 −2.42467E − 23 | B10 2.17352E − 30 | B10 3.09047E − 21 |
| Shape in Meridian-line Direction on Near Side | Shape in Meridian-line Direction on Far Side | Shape in Meridian-line Direction on Near Side | Shape in Meridian-line Direction on Far Side |
| r −1.55515E + 06 | r −1.55515E + 06 | R −5.58113E + 01 | r −5.58113E + 01 |
| D2 1.99783E + 03 | D2 1.99783E + 03 | D2 8.69912E − 06 | D2 9.35011E − 06 |
| D4 2.08800E + 01 | D4 2.08800E + 01 | D4 6.96128E − 10 | D4 3.18561E − 10 |
| D6 0.00000E + 00 | D6 0.00000E + 00 | D6 −2.04608E − 14 | D6 −7.71807E − 15 |
| D8 0.00000E + 00 | D8 0.00000E + 00 | D8 −2.23657E − 18 | D8 −1.82578E − 18 |
| D10 0.00000E + 00 | D10 0.00000E + 00 | D10 −2.92050E − 31 | D10 1.12972E − 23 |

In this embodiment, the angle (incident angle within deflection scan surface) defined by the principal ray of light beam propagating to the center of an effective scanning area and an incident light beam is set to 40°.

The optical axes of the first and second lenses 67a and 67b in this embodiment overlap on each other within the same sub-scanning cross-section as that of the principal ray of a light beam propagating to the center of the effective scanning area of the scanned surface 71.

As described above, each of the first and second lenses 67a and 67b has a positive power, is made of a plastic material (plastic lens), and has an aspherical shape with a concave portion facing the polygon mirror 51. Each aspherical shape is asymmetrical about a corresponding one of the optical axes of the first and second lenses 67a and 67b on the near side from the incident light beam with respect to the optical axis (upper side with respect to the optical axis in FIG. 8A) and the far side from the incident light beam with respect to the optical axis (lower side with respect to the optical axis in FIG. 8A).

The signs of the radii of curvature of the first lens 67a in the generating-line direction on the near side from the incident light beam with respect to the optical axis are always negative. The absolute value of this radius of curvature of each of the incident and exit surfaces gradually increases from the optical axis toward the peripheral portion, takes an extreme value near the middle point between the optical axis and the peripheral portion, and then gradually decreases toward the peripheral portion. The signs of the radii of curvature of the first lens 67a on the far side from the incident light beam with respect to the optical axis are always negative. The absolute value of the radius of curvature of each of the incident and exit surfaces gradually decreases from the optical axis to the peripheral portion. In this case, the absolute value of the exit surface is always smaller than that of the incident surface, and the exit surface exhibits a positive power with respect to a deflected light beam at any field angle. Both the incident and exit surfaces of the first lens 67a in the meridian-line direction are flat.

Each of the absolute values of the radii of curvature of the incident and exit surfaces of the second lens 67b in the generating-line direction on the near side from the incident light beam with respect to the optical axis gradually decreases from the optical axis toward the peripheral portion, takes an extreme value near the middle point, and then gradually increases toward the peripheral portion. The sign of each radius of curvature is inverted from negative to positive at a lens height corresponding to a 70% position, and the absolute value gradually decreases toward the peripheral portion. The radius of curvature of each surface decreases from the optical axis toward the peripheral portion once, takes an extreme value near the middle point, and is inverted in sign from negative to positive at a lens image height near a 70° position.

Each of the absolute values of the radii of curvature of the incident and exit surfaces of the second lens 67b in the generating-line direction on the far side from the incident light beam with respect to the optical axis gradually decreases from the optical axis toward the peripheral portion, takes an extreme value at a lens height near a 30% position, and then increases. Thereafter, the sign of the radius of curvature is inverted from negative to positive at a lens height near a 50% position, and the radius of curvature gradually decreases to the peripheral portion.

The radius of curvature of each surface decreases from the optical axis toward the peripheral portion, takes an extreme value at a lens height near a 30% position, then gradually, increases, and is inverted in sign from negative to positive at a lens image height near 50% position.

The radius of curvature of the meridian-line in the incident surface of the second lens 67b changes symmetrically about the optical axis. The absolute value of this radius of curvature gradually increases from the optical axis to the peripheral portion and takes a negative sign. The radius of curvature of the meridian-line in of the exit surface changes asymmetrically. Each of the absolute values on the near and far sides from the incident light beam with respect to the optical axis gradually increases from the optical axis to the peripheral portion, takes an extreme value at a lens height near a 90% position, and then gradually decreases to the peripheral portion. In this case, the sign of the radius of curvature of the meridian-line in the exit surface is always negative.

Figure 9:
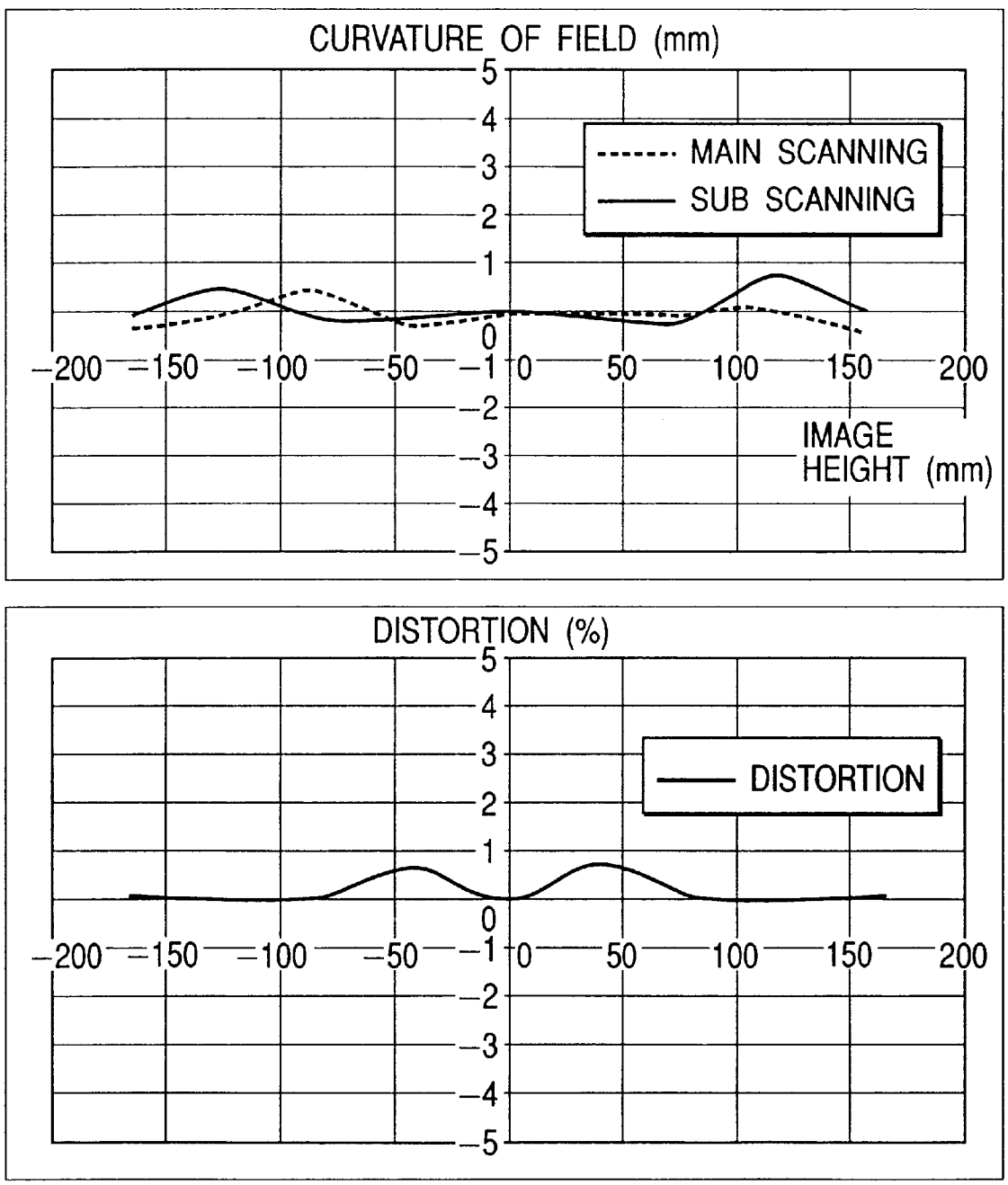
FIG. 9 is a graph showing the curvature of field and distortion the fourth embodiment of the present invention.

As described above, in this embodiment, by properly shaping the first and second lenses 67a and 67b, the curvature of field and distortion can be properly corrected even under the great influence of pupil movement due to an over-field arrangement. FIG. 9 shows the curvature of field and distortion in this case. As is obvious from FIG. 9, the curvature of field and distortion can be properly corrected throughout the entire field angle range.

According to the present invention, as described above, in a scanning optical system using an over-field optical system, each of lenses constituting a second optical system, in particular, is properly formed so that the curvature of field and distortion (f-θ characteristics) in the main scanning and sub-scanning directions can be properly corrected, even if the pupil position moves especially in the main scanning direction upon rotation of the polygon mirror, by forming non-arc shape in the generating-line direction and changing the radius of curvature in the meridian-line direction depending on the field angle. In addition, since all the imaging optical elements disposed between the light deflector and the scanned surface are lenses, the degree of freedom in positioning increases to solve the problems of oblique incident angles and aliasing of imaging mirrors which adversely affect the curvature of field. In addition, with the user of plastic lenses, a scanning optical system which can be easily formed and an image forming apparatus using the scanning optical system can be provided.

What is claimed is:

1. A scanning optical system comprising:

a light source;

a light deflector;

a first optical system for making a light beam emitted by said light source strike a deflection surface of said light deflector with the light beam having a width larger than a width of the deflection surface in a main scanning direction; and a second optical system for imaging the light beam deflected by said light deflector in the form of a spot on a surface to be scanned, said second optical system comprising a first lens and a second lens arranged such that said second lens is located closer to the surface to be scanned than said first lens along an optical axis, wherein said first lens is a meniscus lens with a concave surface facing said light deflector and has a positive power in a main scanning cross-section, and wherein said second lens has an incident surface and an exit surface, each containing a generating-line corresponding to the main scanning direction and having a curvature which decreases from an on-axis position toward a peripheral portion.

2. A system according to claim 1, wherein the light beam emitted by said light source is incident on the deflection surface of said light deflector in a sub-scanning cross-section at a predetermined angle and is incident on the deflection surface substantially from a center of a deflection angle of said light deflector in the main scanning cross-section.

3. A system according to claim 1, wherein said second optical system has an imaging magnification of not more than 1.

4. A system according to claim 1, wherein the sign of the curvature is inverted from positive to negative.

5. A system according to claim 1, wherein the exit surface of said second lens has a radius of curvature in a sub-scanning direction which changes along the main scanning direction, from the on-axis position toward the peripheral portion, such that it increases in negative value until it temporarily takes an extreme value, then it decreases in negative value before it increases again in negative value.

6. A system according to claim 1, wherein the positive power of said first lens decreases from an on-axis position toward a peripheral portion.

7. A system according to claim 1, wherein the exit surface of said second lens has a radius of curvature in a sub-scanning direction which changes along the main scanning direction without any correlation to the generating-line.

8. A system according to claim 1, wherein said second lens has a positive power in a sub-scanning direction which decreases from the on-axis position toward the peripheral portion along the main scanning direction.

9. A system according to claim 1, wherein said first lens is a cylindrical lens having a power only in the main scanning direction.

10. A system according to claim 1, wherein said second lens is located closer to the surface to be scanned than a middle point between said light deflector and the surface to be scanned.

11. A system according to claim 1, wherein the light beam emitted by said light source is incident on the deflection surface of said light defector in a sub-scanning cross-section at a predetermined angle and said second optical system has an imaging magnification of not more than 1 in a sub-scanning direction.

12. A system according to claim 1, wherein the light beam emitted by said light source is incident on the deflection surface of said light deflector in a sub-scanning cross-section at a predetermined angle and said first lens also serves as part of said first optical system.

13. An image forming apparatus comprising a scanning optical system according to any one of claims 1–12, and a photosensitive drum as a surface to be scanned.

* * * * *

UNITED STATES PATENT AND TRADEMARK OFFICE
CERTIFICATE OF CORRECTION

PATENT NO. : 6,512,623 B1
DATED : January 28, 2003
INVENTOR(S) : Keiichiro Ishihara It is certified that error appears in the above-identified patent and that said Letters Patent is hereby corrected as shown below:

<u>Title page,</u>
Item [57], ABSTRACT,
Line 7, "form of" should read -- the form of a --.

<u>Column 8,</u>
Table 2, "First Surface        Second Surface" should read
-- First Lens        Second Lens
First Surface   Second Surface     First Surface   Second Surface --.

<u>Column 12,</u>
Line 61, "has" should be deleted.

<u>Column 15,</u>
Line 18, "is" should be deleted.
Table 6, "02" should be deleted.

<u>Column 16,</u>
Table 6, "-1.67124E +" should read -- 1.67124E + 02 --.

<u>Column 17,</u>
Line 15, "direction," should read -- direction corresponding to the main scanning direction, --.

Signed and Sealed this

Tenth Day of February, 2004

JON W. DUDAS
*Acting Director of the United States Patent and Trademark Office*